(12) United States Patent
Nies

(10) Patent No.: US 8,231,351 B2
(45) Date of Patent: Jul. 31, 2012

(54) ADAPTIVE ROTOR BLADE FOR A WIND TURBINE

(75) Inventor: Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 959 days.

(21) Appl. No.: 11/965,036

(22) Filed: Dec. 27, 2007

(65) Prior Publication Data
US 2009/0169390 A1 Jul. 2, 2009

(51) Int. Cl.
*F03D 1/06* (2006.01)
(52) U.S. Cl. ............................... 416/146 R; 416/223 R
(58) Field of Classification Search .................. 415/912; 416/147, 2, 62, 87, 88, 89, 203, 205
See application file for complete search history.

(56) References Cited

U.S. PATENT DOCUMENTS

| | | | |
|---|---|---|---|
| 6,819,086 B2 | 11/2004 | Wobben | |
| 7,186,083 B2* | 3/2007 | Bayly | 416/87 |
| 7,256,509 B2 | 8/2007 | Brandt et al. | |
| 2006/0104812 A1* | 5/2006 | Kovalsky et al. | 416/87 |
| 2007/0025856 A1* | 2/2007 | Moroz | 416/223 R |
| 2007/0140858 A1* | 6/2007 | Bakhuis et al. | 416/223 R |
| 2009/0081047 A1* | 3/2009 | Koike | 416/223 R |
| 2009/0104038 A1* | 4/2009 | Grabau | 416/223 R |

FOREIGN PATENT DOCUMENTS

| | | |
|---|---|---|
| WO | WO 02/05406 A1 | 1/2002 |
| WO | WO 2005/017350 A1 | 2/2005 |
| WO | WO 2006/007838 A1 | 1/2006 |

* cited by examiner

*Primary Examiner* — Richard Edgar
(74) *Attorney, Agent, or Firm* — Global Patent Operation; Douglas D. Zhang

(57) ABSTRACT

A rotor blade for a wind turbine is provided, the rotor blade having a first module of a first type and a second module of a second type, each module having a distal end and a proximal end, wherein the distal end of the first module and the proximal end of the second module are adapted to be attached to each other to form at least a part of the rotor blade, wherein at least one of said first and second modules is selected from a set of at least two differently shaped modules of the same type. Further, a kit of parts for adapting a wind turbine to a site constraint is provided, the kit of parts comprising several modules for assembling a modular rotor blade, wherein the several modules comprise at least one root-type module and at least one tip-type module and at least one further module of the root-type or the tip-type, wherein the at least one further module has a different shape compared to the other module of the same type. Finally a method for adapting a rotor of a wind turbine to a site constraint is provided.

19 Claims, 8 Drawing Sheets

ADAPTIVE ROTOR BLADE FOR A WIND TURBINE

BACKGROUND OF THE INVENTION

The present patent application relates to a rotor blade for a wind turbine. Further, it relates to a kit of parts for adapting a wind turbine to a site constraint. Finally, the present patent application relates to a method for adapting a rotor of a wind turbine to site constraints.

Wind energy systems have gained more and more importance as a source of energy in recent years. Thus, manufacturers of wind turbines are building more powerful wind turbines that are growing in size such that rotor blades of wind turbines could easily reach the length of 60 m. Wind turbines are classified in different type classes or wind classes that are used for technical certification. The wind or type classes are sorted by different extreme wind velocities and the long term annual mean wind speeds. Four different type classes exist. Therefore, wind turbines are designed for one specific wind or type class out of the four available classes. Accordingly, the manufacturers provide only a limited set of blades for each type class of a wind turbine, wherein the blades are adapted to the different average wind speeds or other situations of the specific wind class. Generally the sites, where a wind turbine is erected, do not exactly comply with a typical wind situation of the wind class of the site. Thus, the turbines are hardly ever used at the conditions they are designed for.

Further to the above, the operators of a wind park often choose a specific wind class or type class in which the turbine should survive 20 years of service. As the wind classes cover a large range of wind speeds, a wind turbine for a specific wind class should able to be operated even at the highest possible wind speeds, i.e. the upper end of the range, in that class. But for the majority of the sites, the wind speeds do not reach the upper end of the range of a specific wind class. Therefore, a wind turbine provided for that wind class does not utilize its complete capability. Even within a wind park, there may be different constraints for individual wind turbines. For example, some wind turbines may be allowed to produce more noise than others due to administrative regulations, some wind turbines may be on mountain ridges, some may be placed less favorable and therefore run at milder loads than designed for.

BRIEF DESCRIPTION OF THE INVENTION

In view of the above, a rotor blade for a wind turbine having a first module of a first type and a second module of a second type is provided, each module having a distal end and a proximal end, wherein the distal end of the first module and the proximal end of the second module are adapted to be attached to each other to form at least a part of the rotor blade, wherein at least one of the modules is selected from a set of at least two differently shaped modules of the same type.

According to a further aspect a kit of parts for adapting a wind turbine to a site constraint is provided, said kit of parts comprising several modules for assembling a modular rotor blade, wherein said several modules comprise at least one root-type module and at least one tip-type module and at least one further module of the root-type or the tip-type, wherein said at least one further module has a different shape compared to the other module of the same type.

According to a further aspect a method for adapting a rotor of a wind turbine to a site constraint is provided, comprising: Evaluating a site constraint of the wind turbine; Selecting a first module from at least two differently shaped first modules of the same type or a second module from at least two differently shaped second modules of the same type, the first and the second module having a proximal and a distal end, respectively; and Fixing the distal end of the first module to the proximal end of the second module such that they are fixed with respect to each other during operation of the wind turbine and form at least a part of a rotor blade.

Further aspects, advantages and features of the present patent application are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

In this context, it should be noted that in the present application the term "in operation" relates to the phase where the wind turbine is ready for operation, i.e. after completion of a construction of the wind turbine. Further, the terms "proximal" and "distal" of a module are defined with respect to the hub if the modules are mounted.

External site constraints in view of the present patent application are constraints imposed by the location of the wind turbine. This might be special wind speed conditions at the place of the wind turbine or constraints like noise limitations.

Figure 1:
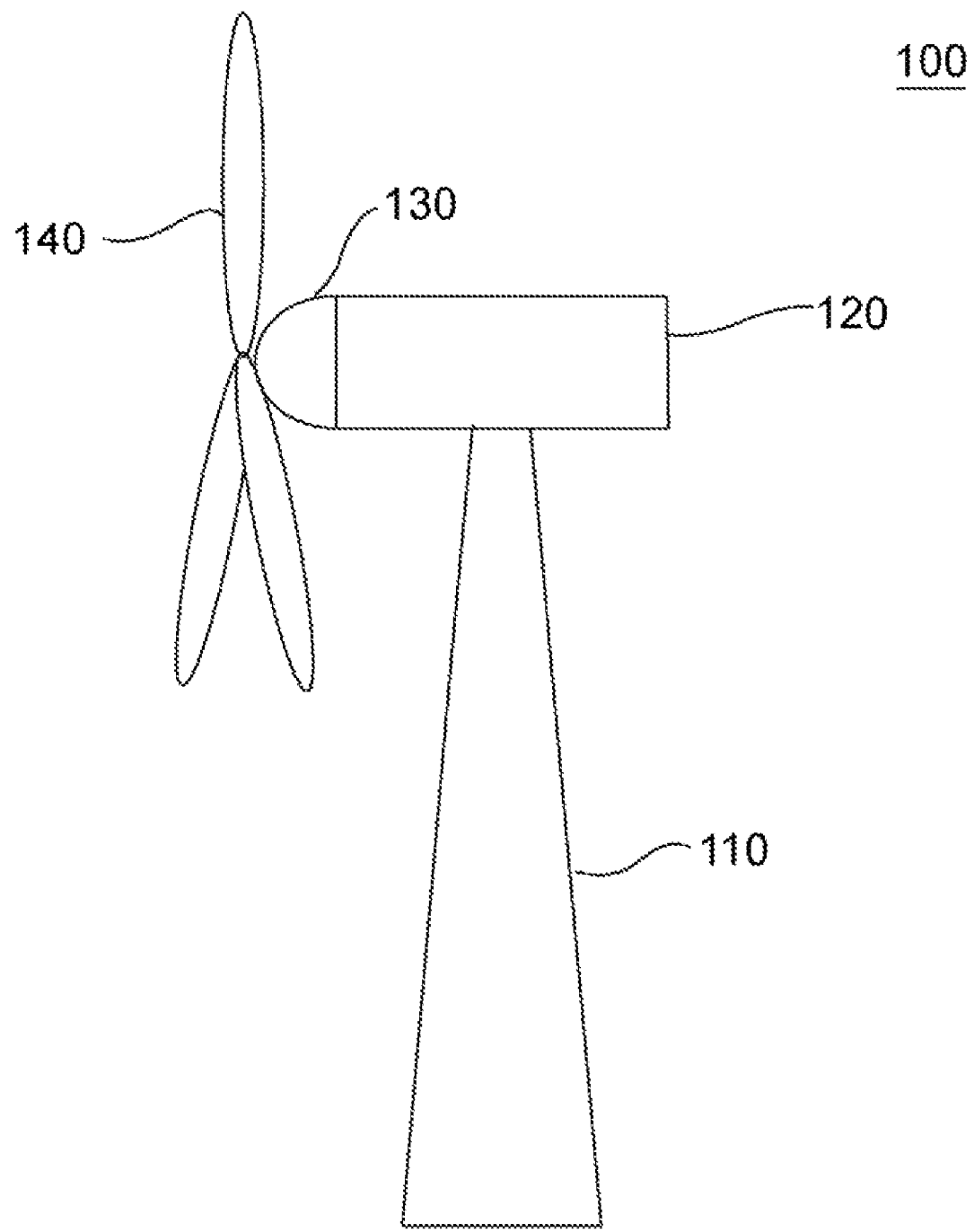
FIG. 1 shows a schematic drawing of a wind turbine.

In FIG. 1 an illustrative drawing of a wind turbine 100 is shown. The wind turbine includes a tower 110. A nacelle 120 is mounted on the top of the tower in which a generator and/or a gearbox are arranged. The nacelle is adapted to rotate about a vertical axis. The generator is connected directly or via the gearbox to a hub 130. At least one rotor blade 140 is connected to the hub 130. The hub 130 and the rotor blade(s) 140 are forming a rotor that is adapted to rotate about a horizontal axis. The blades of the rotor capture kinetic energy of the wind and drive the rotor. The rotation of the rotor is converted by the generator into electrical current. Finally, the electrical current may be fed into a grid or a utility grid.

Figure 2:
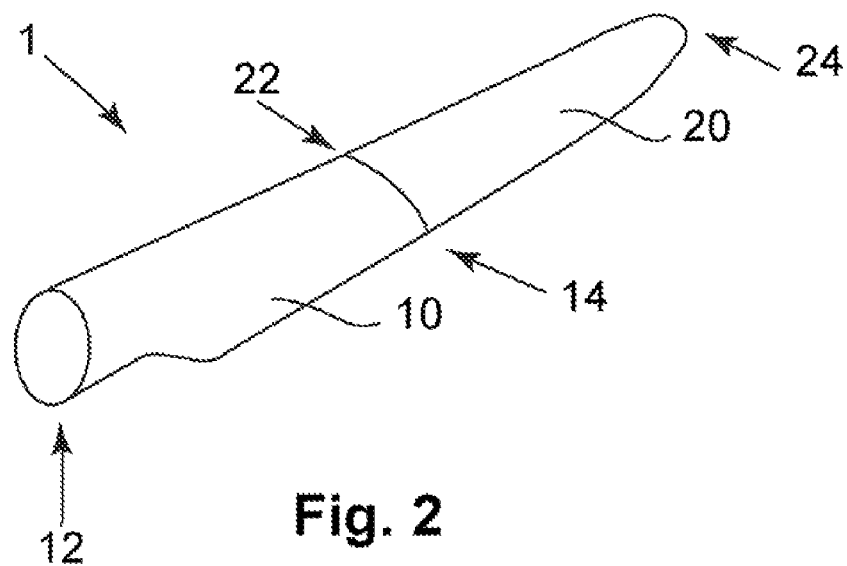
FIG. 2 shows schematic drawing of a rotor blade according to a first embodiment.

The efficiency of a wind turbine depends, amongst other criteria, on the geometrical shape of the rotor blades. Therefore, it would be optimal to have the blade shape adapted to the specific constraints of a wind turbine site. FIG. 2 shows a schematic drawing of a blade 1 according to a first embodiment. The rotor blade 1 may be used in connection with the wind turbine 100 of FIG. 1 as blade 140. Rotor blade 1 is composed of a root module 10 and a tip module 20. The root module has a proximal end 12 and a distal end 14, the proximal end 12 is adapted to be connected to the hub 130 of the wind turbine 100. For that purpose the proximal end 12 of the root module may include a connecting flange. Proximal and distal are defined relative to the hub 130 to which the rotor blade 1 may be connected. The tip module has a proximal end 22 and a distal end 24. The proximal end 22 of the tip module 20 is adapted to be connected to the distal end 14 of the root module 10 such that the rotor blade 1 is formed by the root module 10 and the tip module 20.

Figure 3:
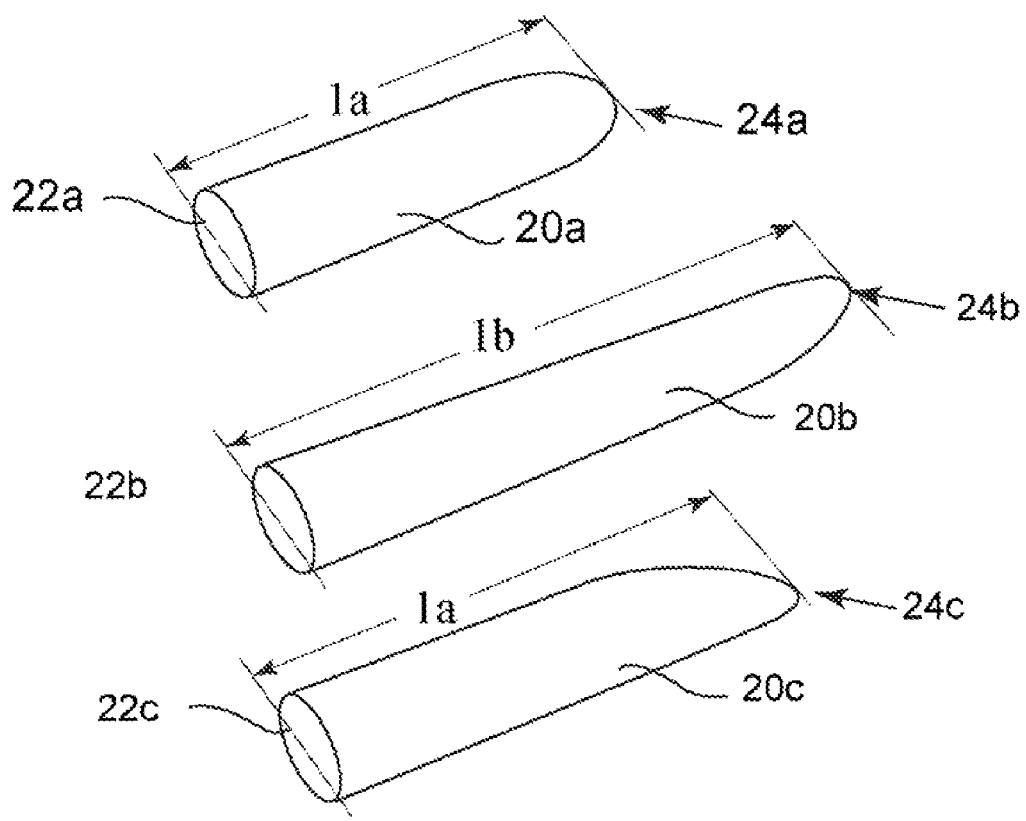
FIG. 3 shows a set of tip modules.

Three different tip modules 20a, 20b, 20c of the same type are shown in FIG. 3. A tip module may also be selected from more modules of the same type, like a set of tip modules may include in an embodiment also two different tip modules or four, five or more different tip modules. Each tip module 20a, 20b, 20c has a proximal end 22a, 22b, 22c and a distal end 24a, 24b, 24c. Further, each tip module 20a, 20b, 20c may have a different length 1a, 1b, 1c with respect to the other tip modules of the same set of tip modules, as shown in FIG. 3. The proximal ends 22a, 22b, 22c of the three tip modules 20a, 20b, 20c are identical in that they include a connector for connecting the tip modules 20a, 20b, 20c to other blade modules. For example, the proximal ends 22a, 22b, 22c may include an identical male or female connector for connecting the tip modules to a root module 10. Thus, the modules 20a, 20b, 20c of the tip module type are interchangeable. The smooth transition from a root module to a tip module might be designed, such that no specific turbulences are generated due to the formation of a blade by two modules, namely a tip module and a root module, compared to a traditional blade consisting only of single module. The usage of a modular rotor blade 1, including a tip module and a root module, may used for a fine adaptation of a rotor to the wind conditions present on the site where the wind turbine is operated. A diameter of the rotor and/or the aerodynamic profile may be adapted to the site.

Figure 4:
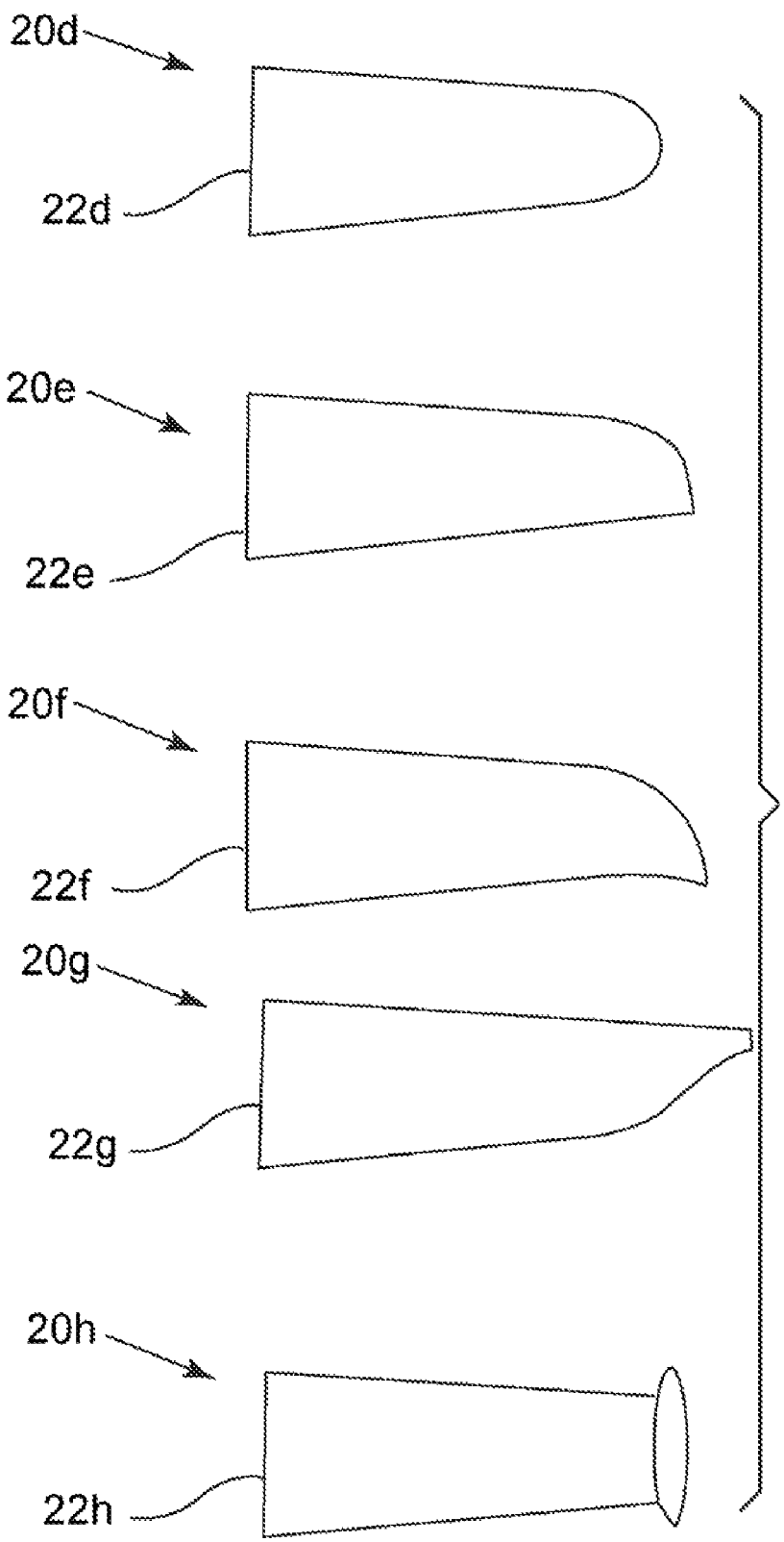
FIG. 4 shows a further set of tip modules.

Typically, the aerodynamic properties of the distal blade portion contribute more to the overall rotor performance than the proximal blade portions near the hub. Accordingly, the choice of a tip shape may be carefully selected. Therefore, chord length distribution in the outer section should remain as close as possible to the theoretical optimal shape. Furthermore, the shape of the blade tip influences the generation of tip vortices and, thus, the induced aerodynamic drag. Therefore, the efficiency of wind turbines can be improved by optimizing the tip shape. Further, the tip shape influences the wind rotor's aerodynamic noise emission. Thus, the tip modules 22d, 22e, 22f, 22g, 22h in the set of tip modules may have a different tip shape as shown in FIG. 4 in a top view. For example, tip module 22d has a standard tip shape, tip module 22e has a straight trailing edge, the tip module 22f has a shark tip, and the tip module 22g has an ogee tip shape. In certain cases, a tip module 22h may have a tip vane. Further to their shape, the tip modules may vary in longitudinal length, i.e. in their length from the tip end to the connecting part which will be attached to the adjacent module.

Figure 5:
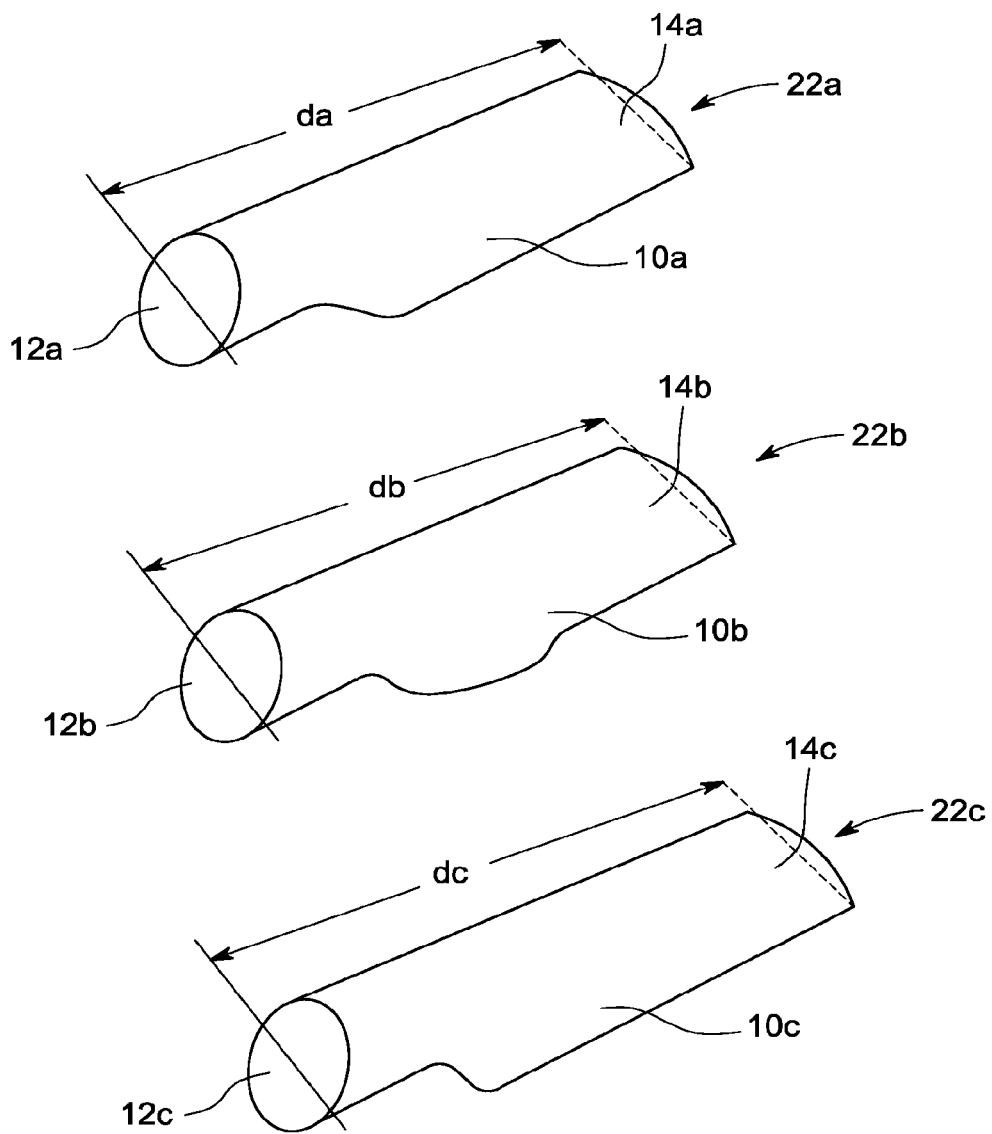
FIG. 5 shows a set of root modules.

FIG. 5, shows modules 10a, 10b, 10c of a root module type. Each root module 10a, 10b, 10c presents a proximal end 12a, 12b, 12c and a distal end 14a, 14b, 14c. The root modules may have a different length da, db, dc and/or a different shape. Each proximal end of the root modules 10a, 10b, 10c has a flange adapted to mount the proximal end 12a, 12b, 12c of the root modules 10a, 10b, 10c to the hub of the wind turbine. The proximal end of the root module may be standardized to fit to the hub of the wind turbine. This is in particular necessary if different modules of the root module type are used. The distal ends 22a, 22b, 22c of root modules comprise a male or a female connector that are identical for each root module 10a, 10b, 10c to provide interchangeable root modules. Further, the distal ends 22a, 22b, 22c of the modules of the same type, e.g. the root module type, are adapted to the proximal end 22 of a tip module. Thus, the modules of the root module type are interchangeable.

Figure 6:
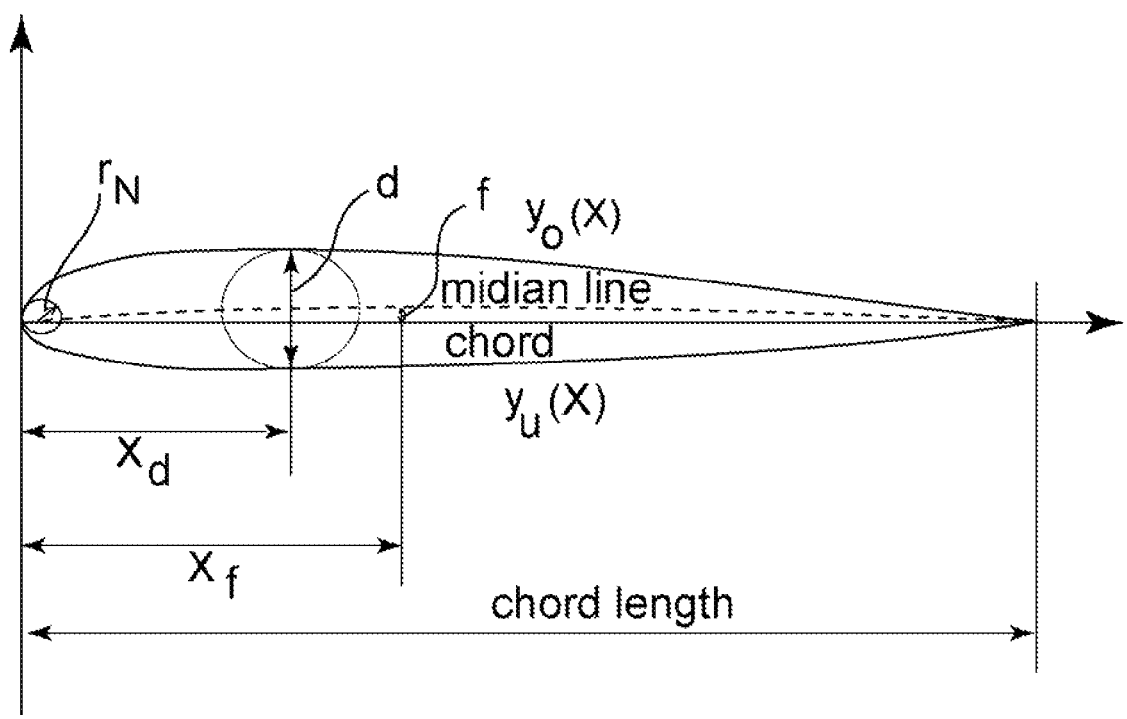
FIG. 6 shows a section of a module of rotor blade.

In a further embodiment, the airfoil of the tip modules and/or the root modules may be varied. The efficiency of fast turning wind turbine rotors is to a great extent determined by the aerodynamic properties of the airfoils or aerodynamic profiles used. For exemplary reasons, a transverse section of a rotor blade is shown in FIG. 6, the section being applicable to root modules as well as to tip modules. Following NACA airfoil series characterization for the rotor blade properties, the following typical parameters are used: chord length c; maximum camber f or camber ratio (f/c) in percent, as maximum curvature of the median line; position of maximum camber $x_f$; maximum airfoil thickness d, as largest diameter of the inscribed circles with their centers on the mean camber line, or thickness-to-chord ratio (d/c) in percent; position of maximum thickness $X_d$; nose radius $r_N$; airfoil coordinates $z_o(x)$ and $z_u(x)$ of the upper and lower side contours, the contour coordinates are listed as tables in airfoil catalogues. For a variation of the blade profile or the airfoil, each of the aforementioned parameters may be varied, e.g. the chord length, the thickness, the thickness-to-chord ratio etc. to adapt the airfoil to specific site conditions.

In a further embodiment, a kit of parts with different root modules 10a, 10b, 10c and different tip modules 20a, 20b, 20c is provided. The modules are designed to be interchangeably used with one another. In other words, each root module 10a, 10b, 10c can be combined with each tip module 20a, 20b, 20c. Therefore, nine different blades can be formed by the kit. The kit of parts may include only two different modules of the same type or three or more modules, e.g. four or five modules of the same type.

Figure 7:
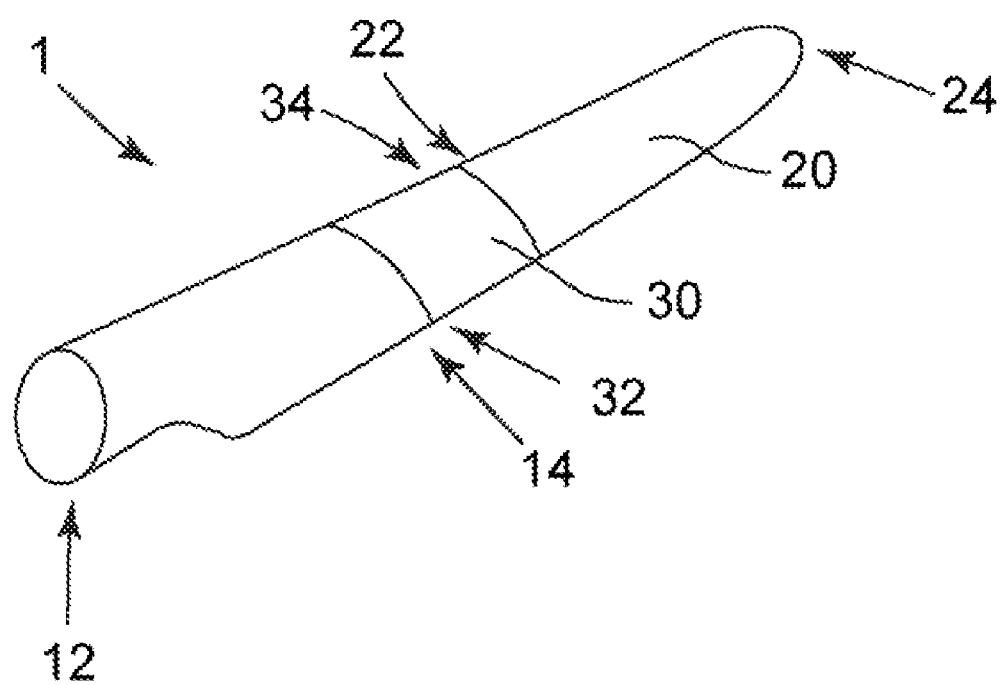
FIG. 7 shows a schematic drawing of a rotor blade according to a further embodiment.

In a further embodiment, the tip module 20 may be connected to the root module 10 via at least one intermediate module 30 as shown in FIG. 7. The intermediate module 30 may also be selected from a set of different intermediate modules, wherein in the different intermediate modules 30 have different longitudinal length, different shape and/or different airfoil configuration as already explained with respect to the tip modules or the root modules. Further, a proximal or distal end 32, 34 of the intermediate module may include male or female connectors. Each intermediate module of a set of intermediate modules has connectors at its proximal end and distal end 32, 34, such that each intermediate module of a set of intermediate modules is replaceable with another different intermediate module. Thus, a type of module may be a root module type, a tip module type, or an intermediate module type.

Thus, the rotor blade 1, 140 of the present patent application is a kit-of-parts construction that provides flexibility in assembly and efficiency The modules are sized for convenient handling and/or according to shipping constraints. Typically, the final assembly of the blade modules is carried out at the wind turbine site. Connections between the different modules of the rotor blade are therefore defined or standardized. Further, a wind turbine using a rotor blade 1, 140 including several modules can be easily upgraded or enhanced if new technology becomes available, e.g. a new tip design for reducing the noise. Additionally, the rotor blade is extensible. Further, the modules may be coupled or replaced as required to accommodate specific design loads. Finally, using a rotor blade including several modules is easily reconfigured, such that components like the modules may be moved between locations to perform the same or a similar function.

A better adaptation of a rotor diameter to the specific site constraints may lead to a better yield of wind energy. Hence the profit of a wind turbine may be increased. The selected module could be the tip module or the root module. In a specific embodiment both the tip module and the root module can be selected from a set of tip or root modules, respectively. In all the embodiments, a proximal end of a tip module may fit to a distal end of a root module, to ensure a fixed connection with each other, wherein the root module and the tip module are rigidly fixed with respect to each other when the wind turbine is in the operation. The different tip modules of a set of tip modules have a different shape relative to each other. The different shape may be only related to a different length, but can also relate to different forms that, for example reduces the noise generation during rotation of the rotor of the wind turbine.

Figure 8:
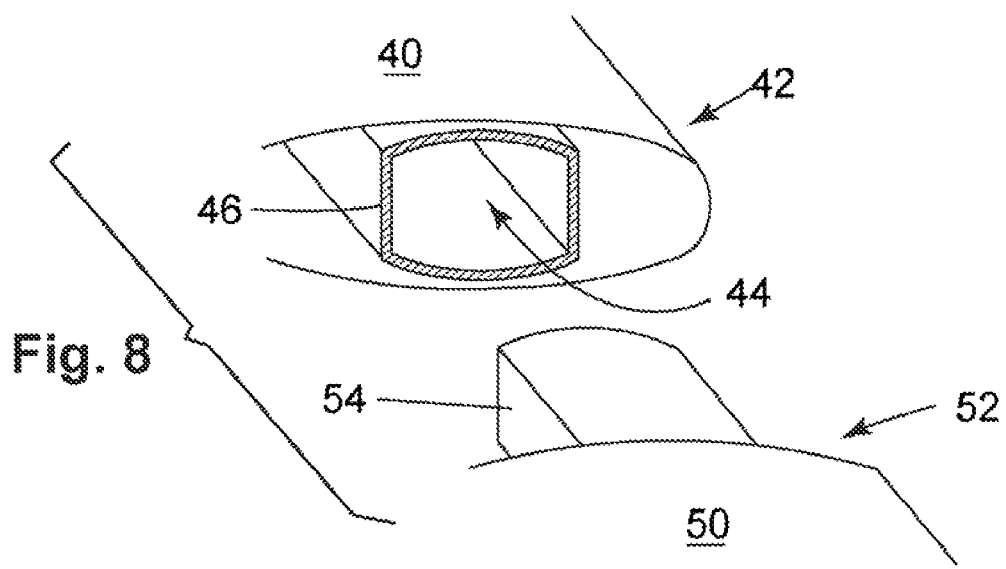
FIG. 8 shows a connector of two different modules.

In an alternative embodiment, the kit may include sets of root sections with different length and blade tips at equal lengths or root sections and tip section that have different length such that the number of possible variants to form a blade is increased drastically. For example root sections may have a length of 40 m and 44 m and tip sections may have a length of 20 m and 22 m. Thus, four different blade lengths may be designed with a combination of two root sections and two tip sections, namely: 60 m, 62 m, 64 m or 66 m. In addition, blade extenders of different hubs may be used and combined with the root section and the tip section. In a further embodiment, the root module represents approximately a half to ¾, in particular ⅔, of a total length of the blade and/or the tip module represents approximately a quarter to a half, in particular a third of the total length of the blade. The total length of the blade is the distance between the proximal end of the root module and the distal end of the tip module FIG. 8 shows a perspective view of a connection portion of a first module 40 and a second module 50. The first module 40 may be a tip module, a root module or an intermediate module. The second module 50 may the module to be connected to the first module, namely a tip module, a root module or an intermediate module. For example the first module 40 is a root module and the second module 50 is a tip module. An end 42 of the first module 40 includes a female connector 44. An end 52 of the second module 50 includes a male connector 54. Furthermore, the cross-sectional shape of male connector 54 and female connector 44 is adapted to a shape of the rotor blade shells. Female connector 44 further includes a sealing flange 46. A similar corresponding sealing flange (not shown) or a bulkhead may be provided at male connector 54. The sealing flanges 46 and/or bulkheads serve to seal the cavity between the male connector 54 and the female connector 44 during vacuum infusion.

Figure 9:
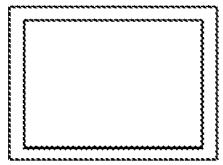
FIG. 9 illustrates a section of a connector of a module.
Figure 10:
FIG. 10 illustrates a further section of a connector of a module.
Figure 11:
FIG. 11 illustrates a further section of a connector of a module.

Typical cross-sectional shapes of male or female connector are shown in FIGS. 9 to 11. FIG. 9 shows a connector having a rectangular cross-section. It should be understood that also a square cross-section is comprised within the meaning of the term 'rectangular'. According to another embodiment of the present invention shown in FIG. 10, the connector has an elliptical cross-section. It should be understood that also a circular cross-section is comprised within the meaning of the term 'elliptical'. An even further embodiment of the present invention is shown in FIG. 11. Therein, the cross-sectional shape of connector is adjusted to the cross-sectional shape of the wind turbine rotor blade 140. The cross-sectional shape is basically rectangular but the upper and lower connecting surfaces are curved so as to follow the shape of the blade shells. Although FIGS. 9 to 11 show the cross-sectional shape of connector, it should be understood that the cross-sectional shapes of female connector 44 will be selected to correspond with the cross-sectional shape of male connector 54. Thus, during a vacuum infusion process uniform distribution of resin between the male connector 54 and the receptacles 44 can be guaranteed. As a result, a uniform bond line is formed between the connector and the receptacles by such an infusion process. Thus, uniform load distribution within the bonding connection between the first and second modules is established. In such a vacuum-infusion process, the seals inside the blade will typically be provided before the joining of the connectors while the vacuum seals at the outside can be reached easily. Thus, the joining section can be vacuumed with only seals at the outside.

Figure 12:
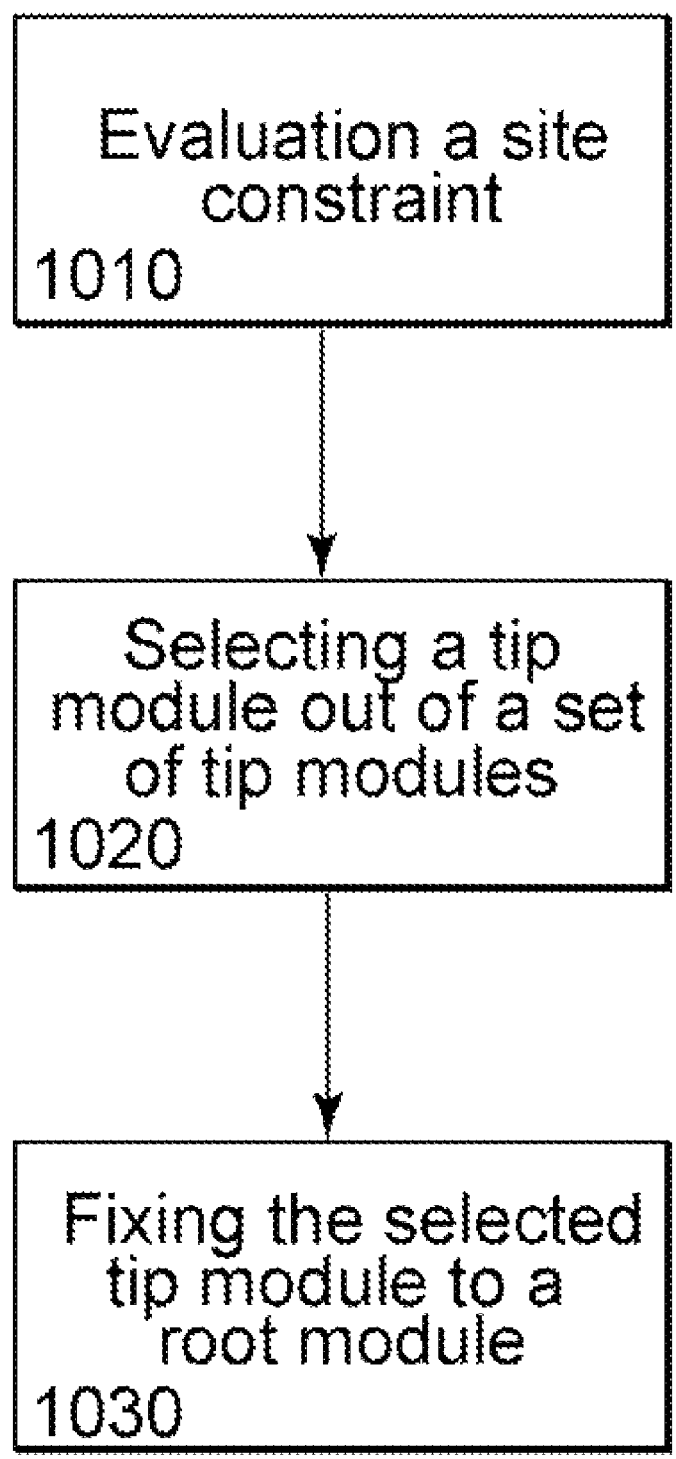
FIG. 12 shows a flow diagram of a method.

In a further embodiment, an automatic setting or site adaptation method may be used that selects the maximum rotor (or any other variable like gearbox ratio) for a wind turbine or a single wind turbine in a wind park. A typical embodiment of the method is explained in conjunction with FIG. 12. In a first step 1010 a site constraint is evaluated. This might be the maximal wind speed at the site, the average wind speed, the turbulence, the noise emission or a combination of several constraints. Dependent on the result of the evaluation, in a second step 1020, a tip module is selected from modules of the same type, e.g. the tip module type, that guarantees the best energy yield of the wind turbine for within the capabilities if the turbine (e.g. the maximum wind speed, the average wind speed, etc.) and for that site constraint, e.g. the maximal wind speed, the average wind speed, the noise emission. Of course, in a further embodiment of the method, also a root module might be selected from modules of a root module type or at least one intermediate module might be selected from modules of an intermediate module type. In a further embodiment all modules might be selected of different modules of the same type. In the last step 1030 the tip module is fixed to the root module. Thus, the complete rotor blade is assembled using the different modules.

The siting method may be implemented in a computer program that considers at least one site constraint and determines an optimal root module from different modules of a root module type and/or an optimal tip module from different modules of a tip module type for that site where the wind turbine is erected.

Thus, a more customized shape of a rotor blade for a wind turbine can be provided, such that also intermediate sizes of blades are available for a costumer. Thus, a manufacturer can develop parts that allow adaptation of the blade length by having blade tips of several length, shapes and construction. In a wider approach other parts of the turbine may be modified likewise: gear ratio (if any), controller, tower height, foundation size and/or type. Hence, the energy production may be enhanced due to the specifically adapting rotor blades to the site. Further, if only either the tip module or the root module are chosen from a set of modules of the same type, the other module can be produced in higher quantities and thus more economically. For example, the root modules could be always the same. Further, the transportation costs can be considerably reduced due to the smaller size of the blade parts. Thus, also for remote sites which are difficult to reach, the blade modules can be transported on the road. Therefore, the blade according to the present patent application is designed in a modular design, wherein each part can be selected among several different parts, for forming the optimal rotor for a wind turbine.

In a typical situation, the manufacturer or an operator of a wind park would have a range of e.g. five blade tips that could be selected. Depending on actual site and micro-site conditions, one of the five blade tips may be chosen. This selection may be based on wind definitions, like the average mean wind speed, the turbulence intensity, the wind shear, extreme wind speeds etc. or on loads calculated with site data (all load components in all nodes in every one of the turbines e.g. of a wind park).

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A rotor blade for a wind turbine comprising a first module of a first type and a second module of a second type, each module comprising a distal end and a proximal end, wherein the distal end of the first module and the proximal end of the second module are configured to be attached to each other to form at least a part of the rotor blade with the first module being disposed axially inside of the second module, wherein each of said first and second modules is selected from a set of at least two differently shaped, interchangeable modules of the same type.

2. The rotor blade according to claim 1, wherein the distal end of the first module and the proximal end of the second module each comprise a connector, the connectors being formed such that each module is interchangeable with another module of the same type.

3. The rotor blade according to claim 1 wherein the first module type is a root module and the second module type is a tip module.

4. The rotor blade according to claim 3, further comprising a third type of modules wherein said third type comprises intermediate modules configured to be mounted between said first and second types of modules.

5. The rotor blade according to claim 4, wherein the proximal end of a module of the root module type comprises a flange for mounting the module to a hub of a rotor of the wind turbine.

6. The rotor blade according to claim 1, wherein the second module type is a tip module type and the first module is an intermediate module type or a root module type.

7. The rotor blade according to claim 6, wherein a module of the tip module type has a standard tip shape, a straight trailing edge, a shark tip, an ogee tip shape, or a tip vane.

8. The rotor blade according to claim 1, wherein the different modules of the same module type have a different length or a different aerodynamic profile.

9. The blade according to claim 8, wherein the different modules of the same type have a different chord length c, maximum camber f, position of maximum camber $x_f$, maximum airfoil thickness d, largest diameter of the inscribed circles with their centers on the mean camber line, thickness-to-chord ratio, position of maximum thickness $x_d$, nose radius $r_N$, or airfoil coordinates of the upper and lower side contours.

10. A kit of parts for configuring a wind turbine to a site constraint, said kit of parts comprising several modules for assembling a modular rotor blade, wherein said several modules comprise at least two differently shaped, interchangeable root-type modules and at least two differently shaped, interchangeable tip-type modules, wherein the modular rotor blade is formed with a root-type module being disposed axially inside of a tip-type module.

11. The kit of parts according to claim 10, wherein different modules of the same type have a different longitudinal length or a different aerodynamic profile.

12. The kit of parts according to claim 11, wherein the different modules of the same type have a different chord length c, maximum camber f, position of maximum camber Xf, maximum airfoil thickness d, largest diameter of the inscribed circles with their centers on the mean camber line, thickness-to-chord ratio, position of maximum thickness xj, nose radius $r_N$, or airfoil coordinates of the upper and lower side contours.

13. The kit of parts according to claim 11, further comprising an intermediate module type being adapted to be mounted between said root-type and said tip-type modules.

14. The kit of parts according to claim 10, wherein each module in the kit of parts comprises at least one connector adapted to connect said module to at least one module of another type.

15. The kit of parts according to claim 14, wherein a module of the tip-type modules has a standard tip shape, a straight trailing edge, a shark tip, an ogee tip shape, or a tip vane.

16. The kit of parts according to claim 10, wherein a distal end of the root-type module and a proximal end of the tip-type module comprise a connector adapted to rigidly connect the root-type and tip-type modules to each other.

17. A method for configuring a rotor blade of a wind turbine to a site constraint, comprising:
evaluating a constraint of the wind turbine;
selecting a first module from at least two differently shaped, interchangeable first modules of the same type and selecting a second module from at least two differently shaped, interchangeable second modules of the same type, the first module and the second module each comprising a proximal and a distal end; and
fixing the distal end of the first module to the proximal end of the second module such that they are fixed with respect to each other during operation of the wind turbine and form at least a part of a rotor blade with the first module being disposed axially inside of the second module.

18. The method according to claim 17, wherein the modules are selected in order to optimize the energy yield of the wind turbine for the site.

19. The method according to claim 17, wherein the site constraint is the extreme wind speed, the wind shear, the turbulence intensity, the maximum noise level of the wind turbine, or the average mean wind speed on the site.

* * * * *